United States Patent
Jacob et al.

(10) Patent No.: US 11,354,345 B2
(45) Date of Patent: Jun. 7, 2022

(54) CLUSTERING TOPICS FOR DATA VISUALIZATION

(71) Applicant: JPMORGAN CHASE BANK, N.A., New York, NY (US)

(72) Inventors: Philip Jacob, Chicago, IL (US); Brandon Chihkai Yang, Chicago, IL (US); Maria Beltran, Chicago, IL (US); Sohajpal Shergill, Chicago, IL (US); Chienchung Chen, Wheaton, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 38 days.

(21) Appl. No.: 16/908,095

(22) Filed: Jun. 22, 2020

(65) Prior Publication Data

US 2021/0397639 A1 Dec. 23, 2021

(51) Int. Cl.
*G06F 16/35* (2019.01)
*H04L 51/046* (2022.01)
*G06F 40/284* (2020.01)
*G06F 40/295* (2020.01)

(52) U.S. Cl.
CPC .......... *G06F 16/358* (2019.01); *G06F 16/355* (2019.01); *G06F 40/284* (2020.01); *G06F 40/295* (2020.01); *H04L 51/046* (2013.01)

(58) Field of Classification Search
CPC .... G06F 16/355; G06F 16/358; G06F 40/284; G06F 40/295; H05L 51/046
See application file for complete search history.

(56) References Cited

U.S. PATENT DOCUMENTS

| | | | |
|---|---|---|---|
| 2002/0099685 A1* | 7/2002 | Takano | G06F 16/93 |
| 2011/0170777 A1* | 7/2011 | Inagaki | G06F 16/35 |
| | | | 382/177 |
| 2014/0325254 A1* | 10/2014 | Mani | G06F 16/285 |
| | | | 714/2 |
| 2016/0224662 A1* | 8/2016 | King | G06F 16/332 |
| 2016/0259778 A1* | 9/2016 | Cookson | G06F 40/284 |
| 2017/0161372 A1* | 6/2017 | Fernández | G06F 40/211 |
| 2018/0173699 A1* | 6/2018 | Tacchi | G06F 16/358 |
| 2019/0182382 A1* | 6/2019 | Mazza | G10L 15/26 |
| 2021/0103608 A1* | 4/2021 | Ganti | G06F 16/353 |

* cited by examiner

*Primary Examiner* — Matthew J Ellis
(74) *Attorney, Agent, or Firm* — Greenberg Traurig LLP (57) ABSTRACT

Systems and methods for receiving a set analyzing case records by extracting case text, performing natural language processing, and allocating each case text to a topic. Topics may be clustered to identify meaningful patterns that are reflected in numerous case records. The data resulting from the analysis may be visualized on a dashboard to allow users to identify and explore these patterns.

20 Claims, 5 Drawing Sheets

CLUSTERING TOPICS FOR DATA VISUALIZATION

BACKGROUND OF THE INVENTION

1. Field of the Invention

Unstructured data may include strings of text that lack a predefined structure or organization.

2. Description of the Related Art

A significant portion of communication that takes place within an organization is performed through the transmission of electronic documents. This may include sending emails, instant messages, or filling out online forms. After any communicated issues are resolved, the electronic communication may be discarded or archived in a server where it no longer serves a purpose.

SUMMARY OF THE INVENTION

The present disclosure relates to using natural language processing to analyze large volumes of unstructured electronic communication for "topics." A topic may be an issue expressed in an electronic communication relating to a problem. While these issues may be resolved over time, thereby ending the primary purposes of the electronic communication, large amounts of the electronic communication may be analyzed for global patterns. These patterns may give insight into an organization for developing future products or features or improvements of different Information Technology (IT) solutions. Each electronic communication may be considered a case where the electronic communication is stored as a case record.

Embodiments are directed to systems and methods for accessing a set of case records and extracting case text from each case record. A text pre-processing rule may be applied to remove text from the case text of at least one case record. A Lemmatization function to normalize case text may be applied. Thereafter, some embodiments include identifying a topic among a plurality of predefined topics for each case record by applying a natural language process to the case text of each case record. In addition, identified topics may for each case record may be clustered into a plurality of clusters according to a predetermined cluster number.

Some embodiments are directed to providing data visualization of clustered topics, where each topic may be associated with several case records. Some embodiments include generating and transmitting dashboard data for presentation at a client device. The dashboard data represents information to be displayed at a client device. The dashboard data may comprise an identification of the largest cluster among the plurality of clusters. The dashboard data may also include information regarding a user-selected cluster. The dashboard data may also comprise an identification of at least one topic within the largest cluster or user-selected cluster. A user may drill down to specific case records within a cluster or a topic within a cluster. Case records may be identified based on user input (e.g., search parameters).

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
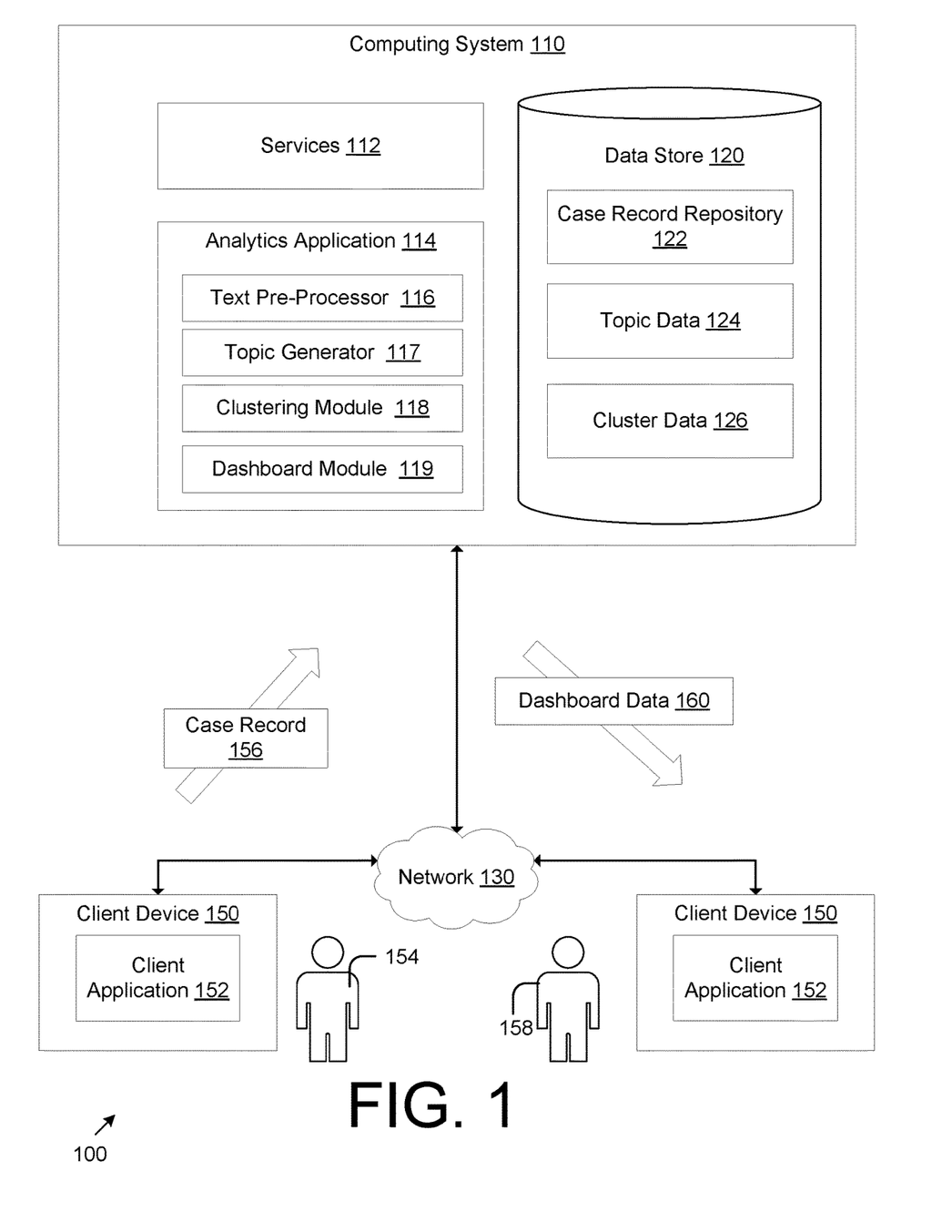
FIG. 1 is a drawing of a networked environment according to various embodiments.

FIG. 1 shows a networked environment 100 according to various embodiments. The networked environment 100 includes a computing system 110 that may execute application programs and store various data. The computing system 110 may be implemented as a server installation or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource, and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110 to execute server-side applications.

Various services 112 may execute in the computing system 110. A service 112 includes software tools, IT solutions, applications, or other software products/features that are used by an organization. Services 112 include internally built software solutions as well as third-party solutions. In some embodiments, the services include Software as a Service (SaaS) solutions offered by third parties or built internally. Services 112 may be executed in a distributed environment and provided to end users. If the organization is a financial institution, the services 112 may include loan application software programs, banking services, database applications, risk calculators, etc.

The computing system may also include an analytics application 114. Various embodiments may be implemented as functionality within the analytics application 114. At a high-level, the analytics application 114 analyzes a volume of unstructured text communication (e.g., a corpus) involving the various services 112. The analysis is used to determine patterns of issues or programs that users experienced when using services 112. The analytics output may provide users with a visualized view of problem areas with the services 112. This can help strategically provide data-driven decisions to improve services 112 by giving insight into product teams.

The analytics application 114 may include several modules. For example, the analytics application 114 may include a text pre-processor 116, a topic generator 117, a clustering module 118, and a dashboard module 119.

The text pre-processor 116 may receive raw input data as unstructured text and apply various rules and functions to generate processed text for input into a natural language processor. The text pre-processor 116 may remove text that is not useful for analytics and may normalize the individual words of the text. To normalize text, the text pre-processor 116 may convert each word to a stein version of the word. This may involve converting the verb tense to a predetermined tense.

The topic generator 117 may include a natural language processor that identifies one or more topics after the unstructured text is pre-processed. The analytics application 114 may be configured to analyze unstructured text with respect to a set of predefined topics. A topic may refer to an issue or problem with respect a service 112.

The natural language processor of the topic generator 117 may generate a Latent Dirichlet Allocation (LDA) model. An LDA model is a generative approach to identifying texts that are similar. The LDA model may use unsupervised machine learning to determine the probabilities that a particular text is of a topic. The LDA model is generated by taking the corpus of multiple pieces of unstructured text (e.g., different electronic communications) and defining a set of topics. The number of topics may be predefined. For example, to generate the LDA model, the developer of the topic generator 117 may specify the number of desired topics. The topic generator 117 builds an LDA model comprising different topics where each topic may have a topic identifier to reference the topic. In addition, each topic may include a series of words and corresponding weights for each word. For example, in the LDA model, a topic may be expressed as follows: Topic 1=(0.053*email, 0.047*issue, 0.026*freeze, 0.025*load). Here, this topic has a topic identifier of "Topic 1" and has four words that define it with corresponding weights. In this respect, the LDA model may rank each word within a particular topic where the rank corresponds to a weight. This topic may be referred to as an "email issue" topic to refer to the highest weighted words within the topic. In addition, each electronic communication is matched to the nearest topic among the set of topics defined by the LDA model by a match probability.

Values such as fuzziness and coherence quantify the accuracy with which the words in a topic relate to the actual content of the cases assigned to the topic. Since the LDA model is a probabilistic model, some case-topic assignments may be less accurate. As a result, some topics may suffer from low probability cases more than others, and the analysis of those becomes disconcerting as one may see unrelated cases grouped together. To address this, the quality of a topic (e.g., its accuracy with respect to case-topic assignments) may be quantified as an accuracy score by using a combination of metrics computed for each topic (e.g., fuzziness, coherence). The accuracy score may be converted into a visual indicator that corresponds to the accuracy score for each topic. The visual indicator of the accuracy score may allow users to validate whether a topic is likely non-cohesive and should be flagged as irrelevant as part of an analysis.

The clustering module 118 clusters the topics by applying a clustering algorithm such as, for example, K-Means, Mean-Shift, density-based spatial clustering applications with noise (DBSCAN), or Fuzzy C-Means. The clustering module may receive a predetermined number of clusters as an input and cluster the topics into clusters. The clustering algorithm may convert each topic defined by the topic generator 117 into a feature vector and then cluster the feature vectors. In this respect, while 100 topics may be generated by the topic generator 117, the clustering module 118 may cluster similar topics into the same cluster. The tolerances for clustering may be defined in the clustering module 118.

The dashboard module 119 may provide an interface with client devices by pushing data to authenticated and authorized users. The dashboard module 119 provides a visualization of data processed by the analytics application 114. The dashboard module 119 may be a server-side portal that provides an interactive experience with users.

The computing system 110 may include a data store 120. The data store 120 may store data, files, executable code, libraries, application programming interfaces (APIs), and other data/executables to allow the application programs of the computing system 110 to execute. For example, the application programs of the computing system 110 may read data from the data store, write data to the data store 120, update, delete, or otherwise manipulate data in the data store 120.

The data store 120 may store case records in a case record repository 122, topic data 124, and cluster data 126. A case record may be a document or file that represents a case. A case record includes textual communication transmitted by a sender. The case record includes unstructured text, which may be human readable text. A case record may be an email, instant message communication, an unstructured text input provided by a form, of some other message including unstructured text. The communication is stored as a case record within the case record repository 122.

The topic data 124 may include the LDA model. The LDA model may define a set of topics based on an input corpus and by applying a specified topic number and word count for each topic. The topic data 124 may also include the topic that corresponds to each case record along with a topic score such as, for example, the maximum topic score. The topic score indicates the strength of match between a particular case record and the topic.

The computing system 110 is coupled to a network 130. The network 130 may include networks such as the Internet, intranets, extranets, wide area networks (WANs), local area networks (LANs), wired networks, wireless networks, or other suitable networks, etc., or any combination of two or more such networks. The computing system may communicate with a plurality of client devices 150 over the network. In this respect, the computing system 110 and client devices 150 may be arranged in a client-server configuration.

The client device 150 may be a personal computing device, laptop, mobile device, smart phone, tablet, desktop, or other device. The client device 150 may include a client application 152 such as a browser or dedicated mobile application to communicate with the computing system 110. The computing system 110 may receive requests from the client device 150 and generate responses using a communication protocol such as, for example, Hyper Text Transport Protocol (HTTP).

Some client devices 150 may be operated by a first set of users 154 who use the services 112 of the computing system 110. The first set of users 154 may be employees, clients, or customers of an organization who are the end-users of the services 112. The first set of users 154 may communicate about issues relating to the services 112. Each communication may be a case record 156 that is transmitted by the client device 150 to the computing system 110 over the network 130.

Some client devices 150 may be operated by a second set of users 158 who review the results of the analytics application 114. For example, the dashboard module 119 may generate dashboard data 160 and transmit it to a client device 150 where the dashboard data 160 is presented on a display of the client device 150. The dashboard data may be formatted as HTML, extensible markup language (XML), or some other web-based document format. The client application 152 may use the dashboard data to render a user interface on the client device 150 to provide visualization of data analytics. The second set of users 158 may interact with the client device 150, thereby generating requests to the computing system 110. Additional dashboard data 160 may be generated in response to the requests.

Figure 2:
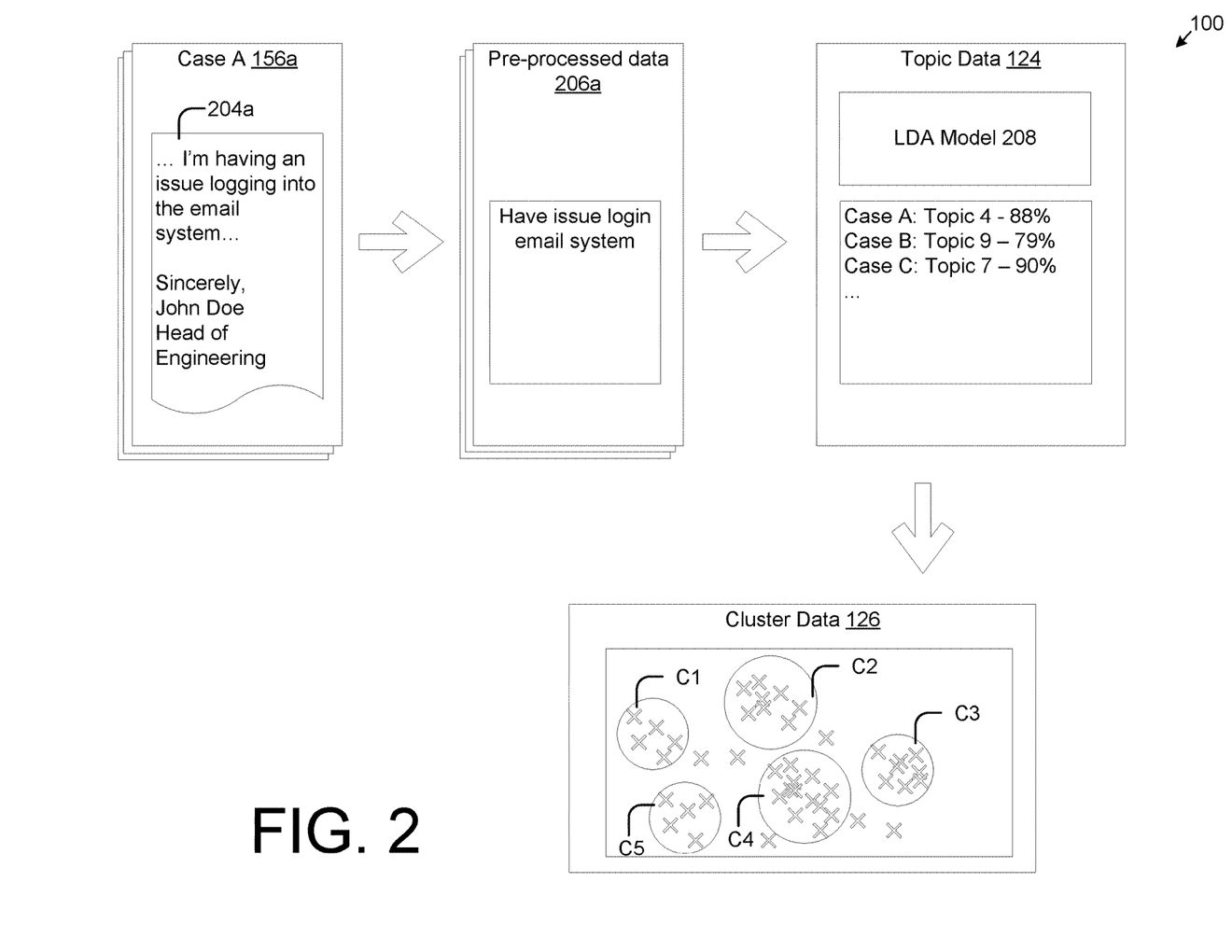
FIG. 2 is a diagram showing data that is stored and/or generated in a networked environment according to various embodiments.

FIG. 2 is a diagram showing data that is stored and/or generated in a networked environment according to various embodiments. The analytics application 114 of FIG. 1 may generate and/or store the data discussed in FIG. 2. FIG. 2 begins with the reception and storage of case records 156 in a case record repository 122. A case record may include any electronic communication including unstructured text. Cases are collected as case records and stored in a data store 120. Each case record may be identified by a case record identifier. FIG. 2 shows an example of one case record 156a having a case record identifier of "Case A." Each case record may include case text 204 such that a first case record includes its own case text 204a. Case text comprises unstructured text. A case record 156 may include metadata or other data structures other than the case text 204. However, the case text 204 is extracted for each case record 156.

The analytics application 114 uses a text pre-processor 116 to process the case text 204 for each of the case records 156. For example, the text pre-processor 116 may format the case text by removing predefined text such as email signature blocks, disclaimer language, heads, footers, message greetings, etc. For example, the text pre-processor 116 in this example the signature block "Sincerely, John Doe Head of Engineering" may be removed from the case text using rules or regular expressions that scan for character patterns such as "sincerely,". The text pre-processor 116 may remove common words that do not provide significant context (e.g., "stop words") such as the words "a", "the", "in", "an", etc.

The text pre-processor 116 may also apply a Lemmatization function to the case text to convert each word into a predefined root word or stein of each word. For example, the word "having" may be converted to the stein word "have."

The text pre-processor outputs case text that is optimized for performing natural language processing. A topic generator 117 may then generate topic data 124 of the pre-processed case text. The topic generator 117 may build an LDA model 208 that identifies each topic by analyzing a volume of case records 156. For example, the case text for a set of case records 156 may be pre-processed and used to generate a term dictionary for the corpus of the case records 156. The term dictionary may include an indexing of each unique term within the set of case records 156. The term dictionary may be converted into a document term matrix. A document term matrix may be formatted as a table that represents the frequency that each term appears in a document. The document-term matrix may specify the frequency of each term in the term dictionary for each case record within the set of case records. The LDA model 208 is generated by using the document-term matrix to identify a set of topics. For example, a developer may configure the LDA model 208 to be generated according to a predetermined number of topics.

In addition, the topic data 124 may specify a topic identifier for each case record 156 within the set of case records 156. The topic identifier corresponds to the topic having the maximum topic score. For example, Case Record A 156a may have a topic score of 88% with respect to Topic 4, where Topic 4 is the closest match to Case Record A 156a according to the topic score. In this respect, the words in the case text 204a of Case Record A 156a most closely align with the words that define Topic 4 as compared to the other topics.

After each case record 156 is assigned to its closest matched topic, cluster data 126 may be generated. Each topic defined by the LDA model 208 may be converted into a feature vector and then clustered according to a cluster number. FIG. 2 shows each topic mapped onto a visual representation of a feature vector space. Clusters in the feature vector space emerge. Each cluster C1-C5 includes a corresponding subset of topics defined by the LDA model 208.

Figure 3:
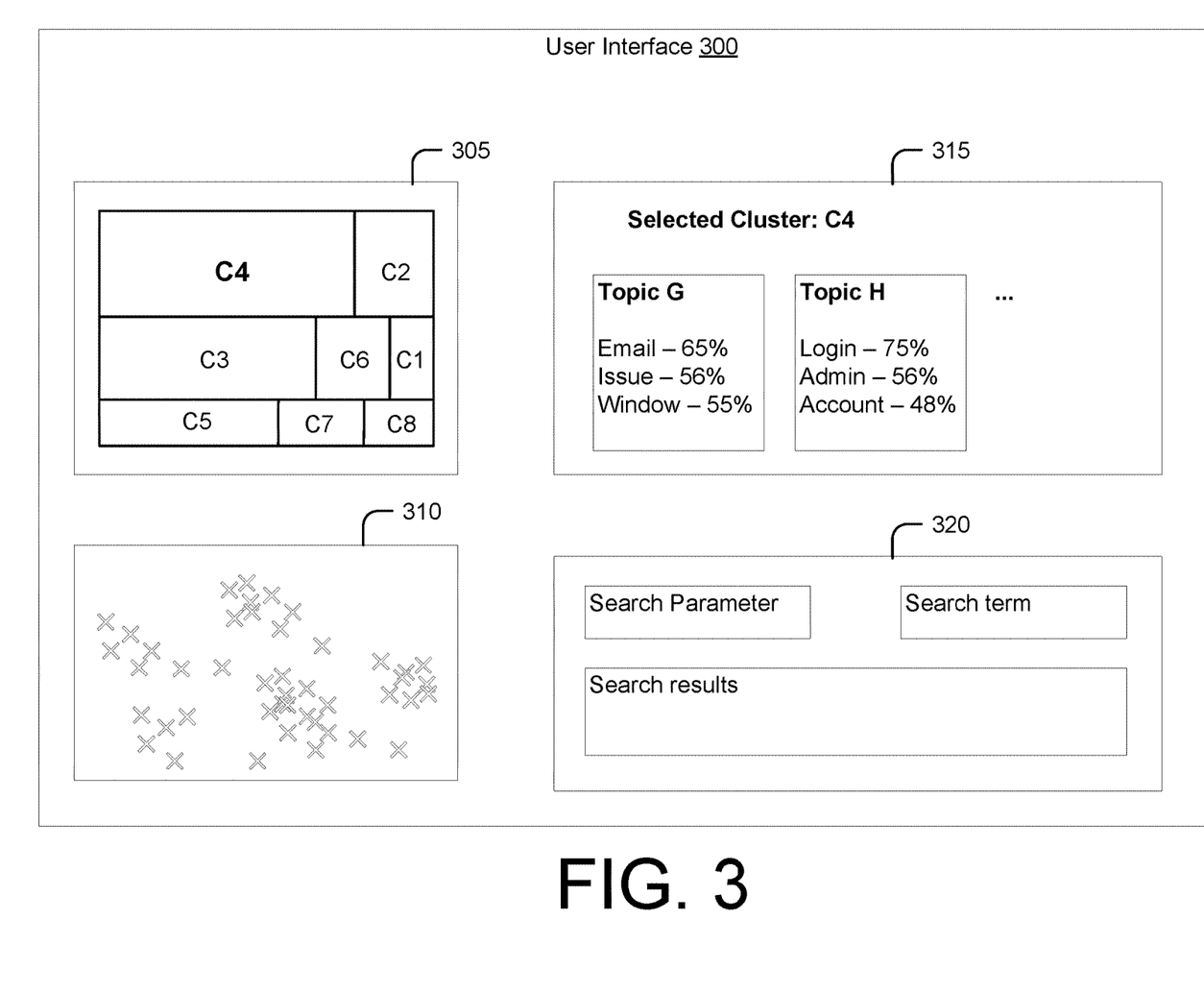
FIG. 3 is a drawing showing an example of a user interface in a network environment according to various embodiments.

FIG. 3 is a drawing showing an example of a user interface 300 in a network environment according to various embodiments. The user interface 300 may be rendered at a client device 150 by a client application 152. The data used to generate the user interface may be provided by the computing system 110 as dashboard data 160. A dashboard module 119 may interface with the client device 150 to cause the display of the user interface 300.

The user interface 300 may include a first portion 305 that identifies the clusters determined by the analytics application 114. Each cluster may be assigned a cluster identifier (e.g., C1, C2, C3, etc.). Each cluster may include a respective subset of topics as defined in the topic data 124. The clusters may be represented as visual shapes, where the shape size or dimension corresponds to the size of the cluster. In some embodiments, the cluster size may be defined by the number of topics within the cluster. In other embodiments, the cluster size may be defined by the number of case records 156 having topics within the cluster. Clusters having larger cluster sizes may also be prioritized higher by visually offsetting them from other clusters. For example, the order in which clusters appear may be listed in a higher order or different colors may use to connote the size of the cluster relative to other clusters. In addition, each cluster may be presented with a visual indicator that represents the accuracy of each cluster. The accuracy may be calculated based on a combination of coherence, fuzziness, and other metrics generated by the LDA model when assigning topics to cases. The visual indicator may be a color, pattern, font-style, shape, or any other visual indicator that reflects an accuracy score.

Each shape representing its corresponding cluster may be selected by a user. This allows a user to select a particular cluster to drill down into the case records 156 that make up the cluster. As a default, the cluster with the largest cluster size may be selected first.

The user interface 300 may include a second portion 310 that includes a graph. The graph has the feature vectors of each topic converted into a visual space. For example, one or more features may define an x-axis, one or more features may define a y-axis, and one or more features may define color, one or more features may define size. Each feature vector is therefore plotted in the visual feature vector space. This allows the user to see how topics are clustered. In some embodiments, the user may change the cluster size by selecting a new cluster size to regenerate the clusters.

The user interface 300 may include a third portion 315 that provides information about a selected cluster. In the example of FIG. 3, cluster C4 is selected (e.g., by default as the largest cluster or selected by the user). The third portion may contain information about each topic included in the selected cluster. The information may identify the topic identifier (e.g., name of the topic) and the words that make up the topic. The information may also identify the weight assigned to each term within the topic. In some embodiments, only the words having a score that exceeds a threshold level or at least a top ranked word of the topic is presented in the third portion 315. In some embodiments a predetermined number of words that make up the topic are presented. As shown in FIG. 3, Cluster C4 includes Topic G and Topic H, and potentially other topics.

The user interface 300 may include a fourth portion 320 that allows a user to drill down to specific case records that make up the selected cluster. For example, the fourth portion 320 may allow a user to specify filter parameters (e.g. search parameter, search term, filter tags, etc.). The filter parameter may include a type of metadata such as for example, a date range, a sender identifier, a product name (e.g., name of a service 112), or other data that provides context about a case record 156. The filter parameters may also include unstructured text such as a keyword or may be a user selectable option. A search parameter and search term together may allow a user to filter down the case records within a particular cluster.

These results are presented in a window within the fourth portion 320. This allows a user to review specific case records within a cluster. This may help a user get an idea of representative case records within a cluster. The clustering groups together like case records that may be searched. As a result, an advantage according to embodiments is to provide a centralized view of all communications about a similar topic in a single user interface 300 to evaluate issues or problems with a service 112. This allows product managers the ability to identify improvements in a service 112 after individual cases have been resolved.

Figure 4:
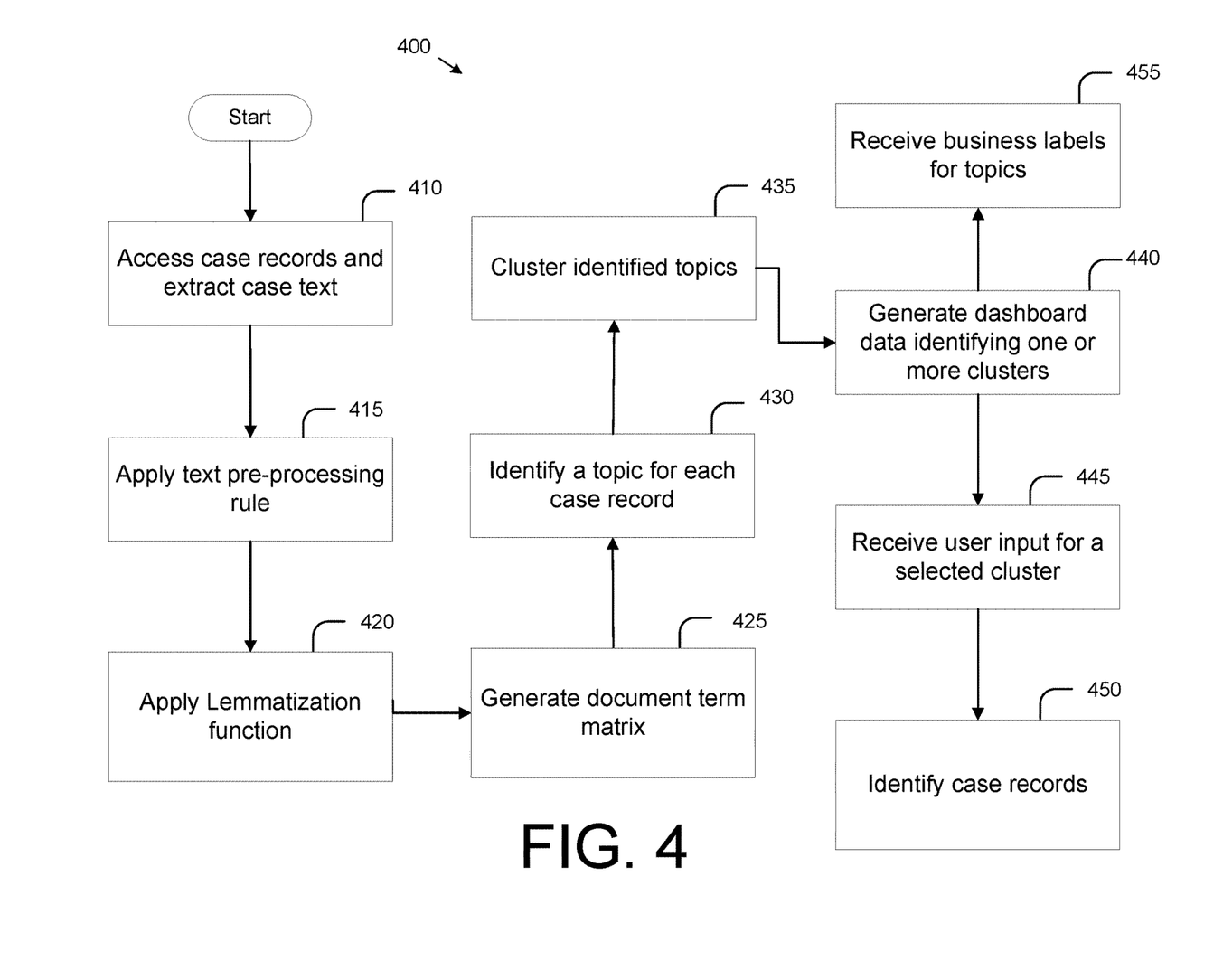
FIG. 4 is a flowchart illustrating an example of the functionality of an analytics application according to various embodiments.

FIG. 4 is a flowchart illustrating an example of the functionality of an analytics application according to various embodiments. It is understood that the flowchart of FIG. 4 provides an illustrative example of the many different types of functional arrangements that may be employed to implement the operation of the portion of a computing system as described herein. The flowchart of FIG. 4 may also be viewed as depicting an example of a method 400 implemented in the networked environment 100 of FIG. 1 according to one or more embodiments. FIG. 4 may represent the functionality of an analytics application, such as, for example, the analytics application 114 of FIG. 1.

At item 410, the computing system 110 accesses case records and extract case text from the case records. Case records may be collected in a case record repository. The computing system 110 may analyze each case record to identify the body of text that makes up the case record. In some instances, the case text is referred to as a document. The case text is unstructured text and may be a string of characters with line breaks, page breaks, and other textual features.

At item 415, the computing system 110 applies one or more text pre-processing rules. for example, a text pre-processor may remove text from the unstructured text. The text pre-processor may use one or more regular expressions containing predefined text. Predefined text may include signature blocks or disclaimer languages found in email communication. For example, a regular expression may search for a character string containing the word "sincerely" followed by a comma and a carriage return or line break. This may indicate the beginning of a signature block. The text pre-processor may remove all text beginning with the signature block to the end of the unstructured text. The text pre-processor may remove predefined textual phrases that include boilerplate language such as, disclaimer language.

In the embodiment where the case record is an email, the text pre-processing rule may search for reply lines in an email chain and remove all email text except for the first email message in a thread of emails. For example, regular expressions may be used to detect the end of the first email message and remove all following text.

At item 420, the computing system 110 applies a Lemmatization function to the case text. The Lemmatization function converts the case text into a series of stein words. In addition, stop words may be removed from the case text.

At item 425, the computing system 110 generates a document term matrix. The document-term matrix may specify the frequency that specific terms appear within each case record after pre-processing the case text of each case record.

At item 430, the computing system 110 identifies a topic for each case record. The computing system 110 may build an LDA model for the corpus of case records to generate the topics. Then, the computing system may identify the topic having the highest score for each case record. A case record having words that closely match the words of a topic may have a higher topic score with respect to that topic. The LDA model may be stored as topic data. In addition, each case record may be labeled with respect to a corresponding topic, which is stored as topic data.

At item 435, the computing system clusters the identified topics. The computing system 110 groups each of the topics generated from analyzing the case text of the case records and groups them into clusters. The number of clusters may be provided as an input, where the clustering is performed to arrive at the number of clusters.

At item 440, the computing system generates dashboard data that identifies one or more clusters. For example, the dashboard data may include data representing the clustering result so that the clustering result is displayed via a user interface. The dashboard data may include data used to render the user interface 300 of FIG. 3. Each cluster may be identified by a cluster identifier.

In some embodiments, a user may select one or more clusters via the user interface. The computing system may receive data indicating the selected cluster and in response, it may present a set of topics associated with the selected cluster. For example, the computing system may generate dashboard data comprising the one or more topics within the selected cluster and one or more terms of the topics. In addition, a top-ranked word for each topic within the set of topics may be presented in the user interface. This may appear as a portion of the user interface such as the third portion 315 of the user interface 300 of FIG. 3.

At item 445, the computing system may receive user input for a selected cluster. The user input may include one or more filter parameters associated with the selected cluster. Filter parameters may include search parameters, search terms, or other user selects to narrow down a comprehensive set of case records into a smaller subset of case records. In this respect, the user may drill down the case records of a selected cluster into a small subset. The computing system may identify the subset of case records associated with the selected cluster according to the filter parameters by searching the case record repository, there the case record search is limited to the selected cluster.

At item 450, the computing system identifies a subset of case records associated with the selected cluster according to the filter parameters. The identified subset of case records is sent to the client device as dashboard data, which is presented to the user at the client device.

In addition, after the computing system generates the dashboard, the computing system may receive a business label for one or more topics at item 455. Because a topic is represented by words that may be disjointed, a user may assign a business label to the topic via the dashboard to better characterize the cases represented by the topic. For example, a topic including top words such as "email," "issue," and "window" may be assigned a business label of "frozen email window." The business label may be displayed in the dashboard upon a user selection of a topic.

Figure 5:
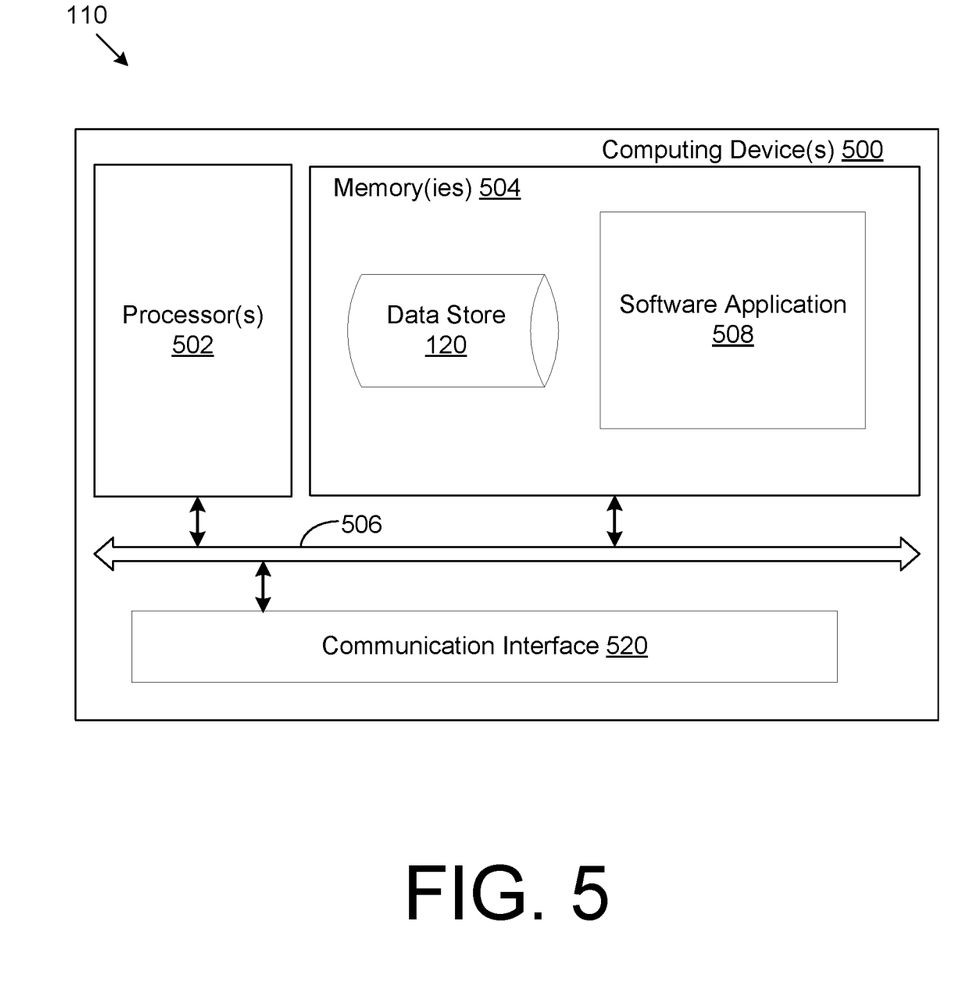
FIG. 5 is a schematic showing an example of an implementation of various embodiments in a computing system.

FIG. 5 is a schematic showing an example of an implementation of various embodiments in a computing system 110. The computing system 110 may include one or more computing devices 500 with distributed hardware and software to implement the functionality of the computing system 110.

The computing device 500 includes at least one processor circuit, for example, having a processor 502 and memory 504, both of which are coupled to a local interface 506 or bus. Stored in the memory 504 are both data and several components that are executable by the processor 502. For example, the memory 504 may include the data store 120 as well as other memory components that store data or executables.

Also stored in the memory 504 and executable by the processor 502 is a software application 508. The software application may implement the method 400 of FIG. 4. The software application 508 may include one or more modules of the analytics application 114 of FIG. 1.

It is understood that there may be other applications that are stored in the memory 504 and are executable by the processor 502 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 506 may be an appropriate network that facilitates communication between any two of the multiple processors 502, between any processor 502 and any of the memories 504, or between any two of the memories 504, etc. The local interface 506 may couple to additional systems such as the communication interface 520 to coordinate communication with remote systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a system such as a software application 508 or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 502 in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software application 508, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for scoring an entity, the method comprising the steps of: accessing a set of case records and extracting case text from each case record; applying a text pre-processing rue to remove text from the case text of each case record; receiving a specification of a number of topics of a generative model, building the generative model, wherein the generative model is based on the case text and includes the number of topics, and wherein each topic of the number of topics includes a series of words and a corresponding weight assigned to each word in the series of words, matching each ease record to one of the number of topics based on a match probability between the respective case text of each case record and the weight assigned to each word in the series of words included in the one of the number of topics, clustering the number of topics into a plurality of clusters according to a predetermined duster number; generating and transmitting dashboard data for presentation at a client device, the dashboard data comprising an identification of a largest duster among the plurality of dusters and an identification of at least one topic within the largest duster; and identifying at least one identified case record within the largest duster in response to user input.

2. The method of claim 1, wherein at least a portion of the case records comprise email records.

3. The method of claim 1, wherein the text pre-processing rule comprises a regular expression containing predefined text.

4. The method of claim 3, wherein the predefined text comprises at least one of a signature block or disclaimer language.

5. The method of claim 1, further comprising applying a Lemmatization function to normalize the case text of each case record prior to matching each case record.

6. The method of claim 1, wherein the one of the number of topics is identified by selecting a maximum topic score for each case record.

7. The method of claim 1, further comprising:
receiving, from the client device, a selection of a cluster among the plurality of clusters; and
presenting a set of topics associated with the selected cluster.

8. The method of claim 7, further comprising presenting a top-ranked word for each topic within the set of topics.

9. The method of claim 7, further comprising:
receiving, from the client device, filter parameters associated with the selected cluster; and
identifying a subset of case records associated with the selected cluster according to the filter parameters.

10. The method of claim 1, further comprising generating a document term matrix for the set of records prior to identifying the one of the number of topics for each case record.

11. An apparatus comprising: a processor; and a memory that stores a plurality of instructions, which. when executed by the processor, cause the apparatus to: access a set of case records and extract case text from each case record; apply a Lemmatization function to normalize the case text of each case record; receive a specification of a number of topics of a generative model, build the generative model, wherein the generative model is based on the case text and includes the number of topics, and wherein each topic of the number of topics includes a series of words and a corresponding weight assigned to each word in the series of words, match each case record to one of the number of topics based on a match probability between the respective case text of each case record and the weight assigned to each word in the series of words included in the one of the number of topics, cluster the number of topics into a plurality of clusters according to a predetermined cluster number; generate and transmit dashboard data for presentation at a client device, the dashboard data comprising a cluster size for at least one cluster among the plurality of clusters and an identification of at least one topic within the at least one cluster; and identify at least one identified case record within the at least one cluster in response to user input.

12. The apparatus of claim 11, wherein at least a portion of the case records comprise email records.

13. The apparatus of claim 11, wherein the plurality of instructions, which, when executed by the processor, further cause the apparatus to:

apply a text pre-processing rule to remove text from the case text of at least one case record.

14. The apparatus of claim 13, wherein the text pre-processing rule comprises a regular expression containing predefined text.

15. The apparatus of claim 14, wherein the predefined text comprises at least one of a signature block or disclaimer language.

16. The apparatus of claim 11, wherein the one of the number of topics is identified by selecting a maximum topic score for each case record.

17. The apparatus of claim 11, wherein the at least one cluster is identified by a user selection at the client device, wherein a set of topics associated with the at least one cluster is presented at the client device.

18. The apparatus of claim 17, wherein a top-ranked word for each topic within the set of topics is presented at the client device.

19. The apparatus of claim 11, wherein the user input comprises filter parameters associated with the at least one cluster, and wherein the at least one identified case record is identified according to the filter parameters.

20. The apparatus of claim 11, wherein the plurality of instructions, which, when executed by the processor, further cause the apparatus to:

generate a document term matrix for the set of case records.

* * * * *